July 11, 1939.  E. J. RUSH  2,165,873
GLASS FEEDER
Filed June 30, 1938  3 Sheets-Sheet 1
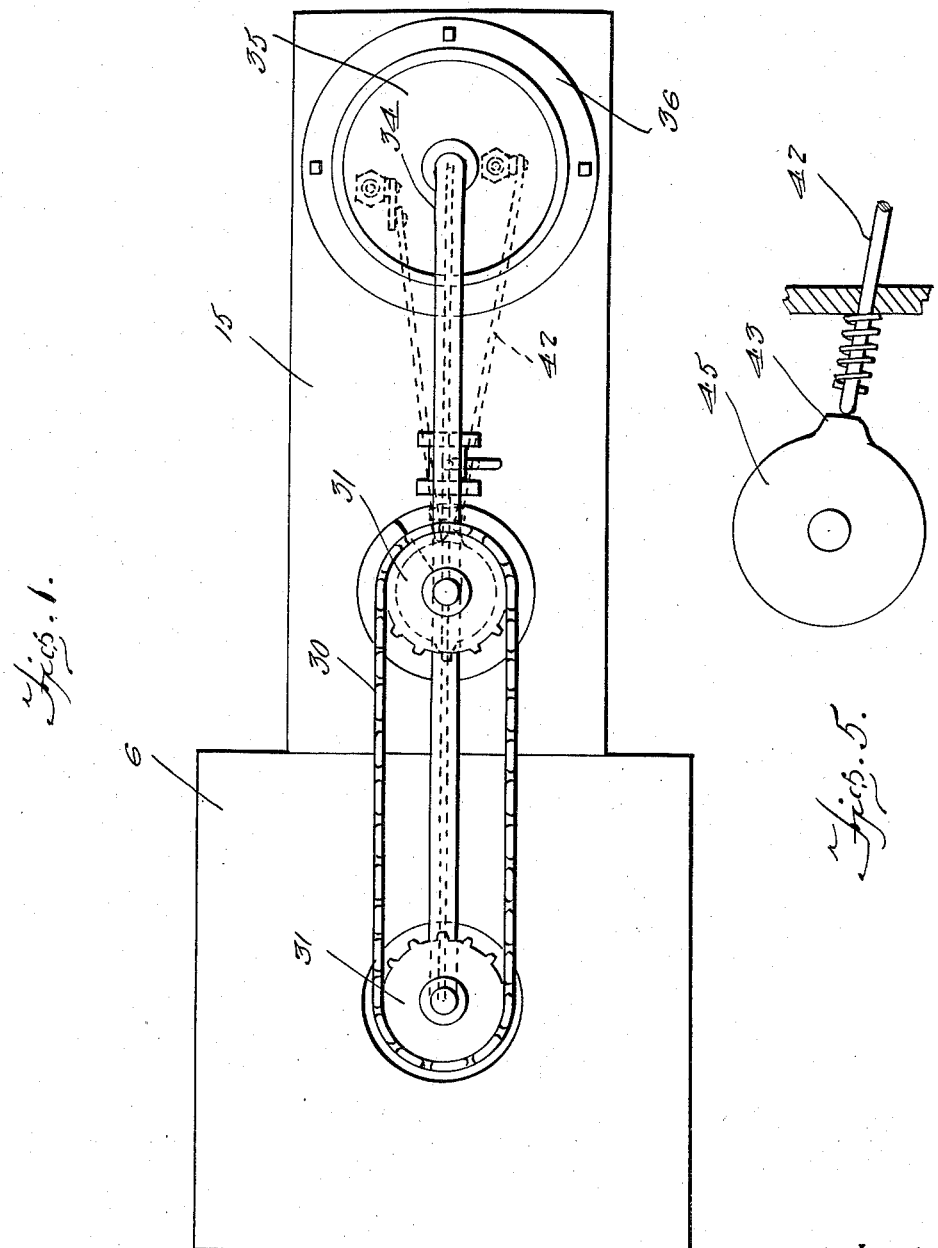
Inventor
E. J. Rush
By Clarence A. O'Brien
and Hyman Berman
Attorneys

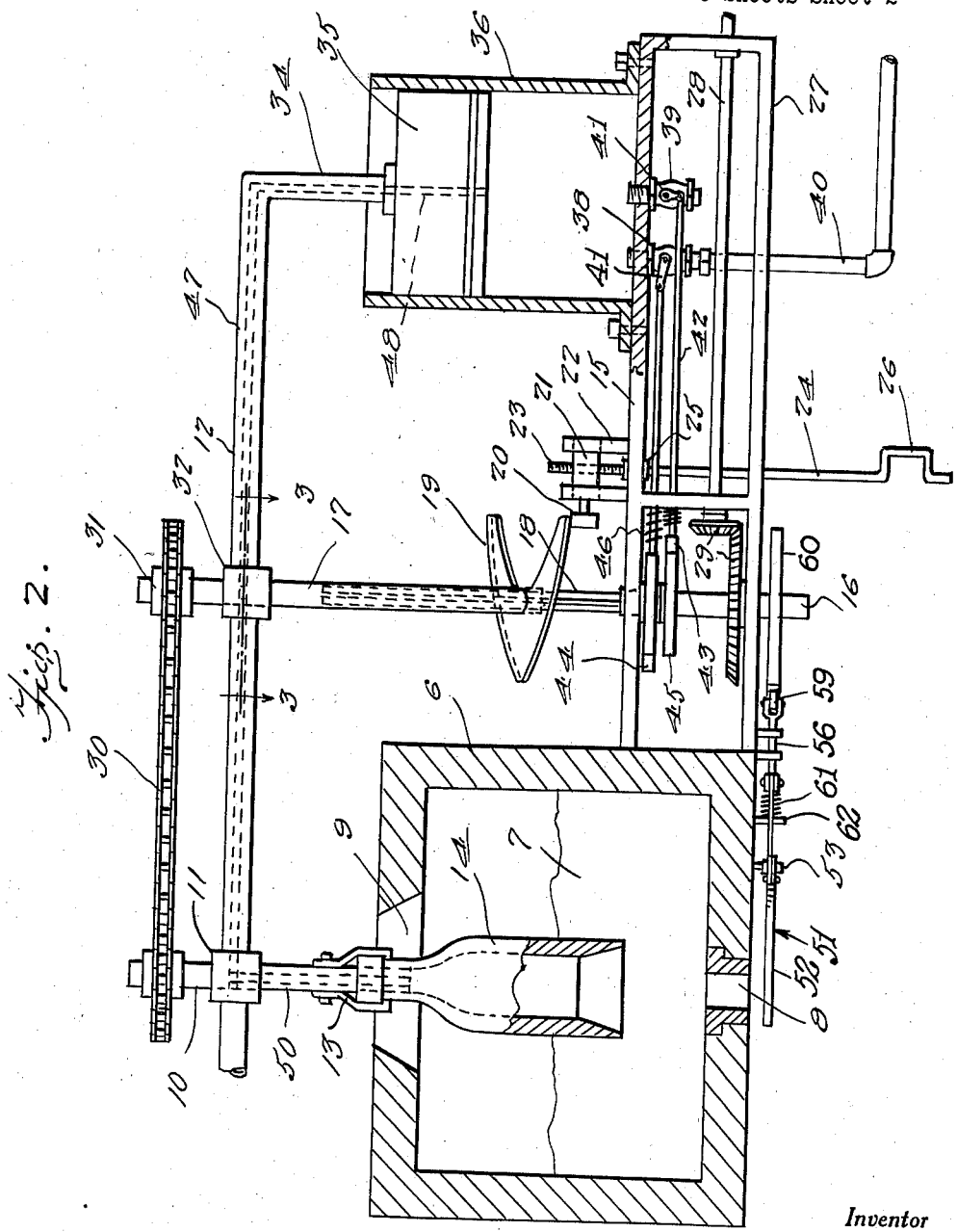

July 11, 1939.  E. J. RUSH  2,165,873
GLASS FEEDER
Filed June 30, 1938  3 Sheets-Sheet 3
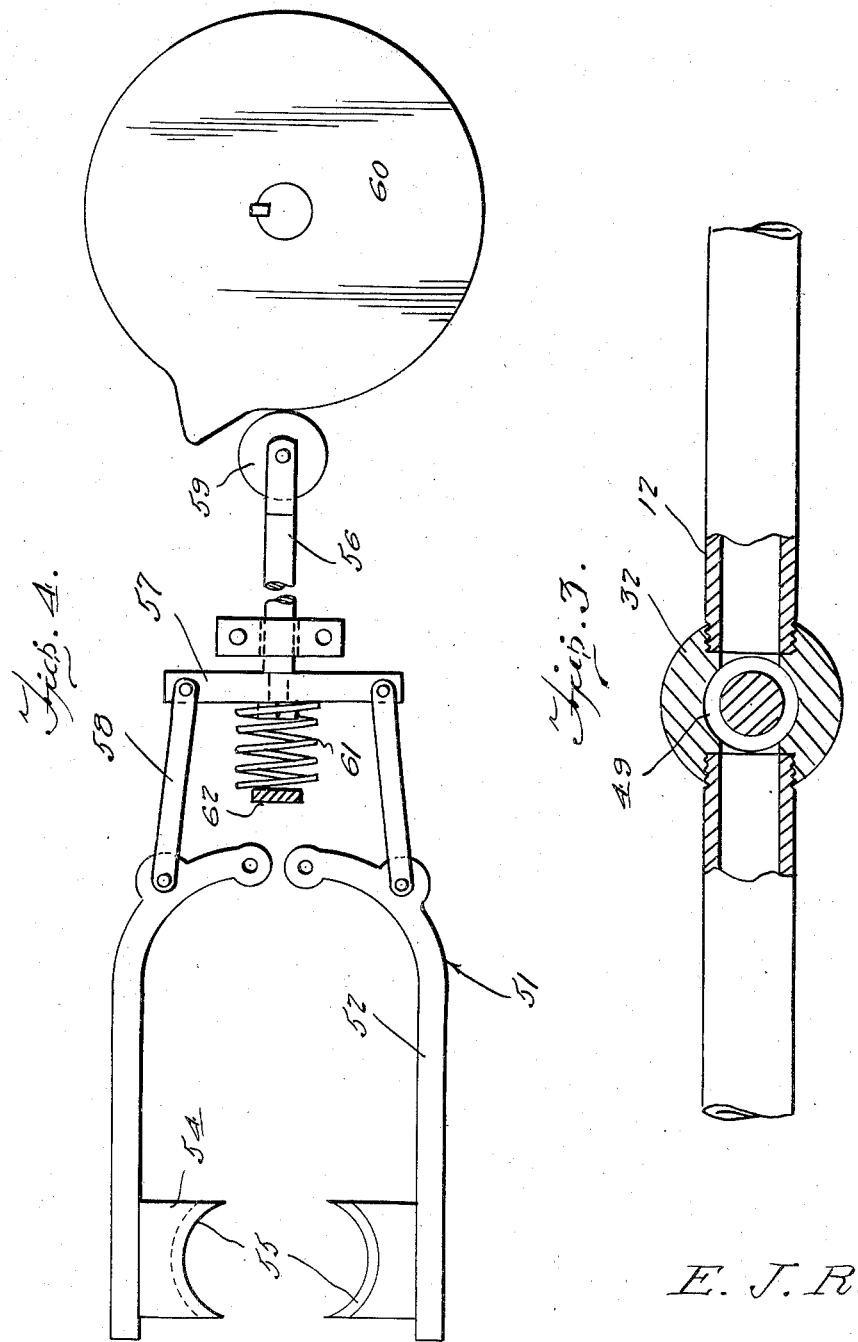
Inventor
*E. J. Rush*
By *Clarence A. O'Brien
and Hyman Berman*
Attorneys Patented July 11, 1939

2,165,873

UNITED STATES PATENT OFFICE 2,165,873

GLASS FEEDER

Edgar Jacob Rush, Lancaster, Ohio

Application June 30, 1938, Serial No. 216,820

4 Claims. (Cl. 49—55)

This invention relates to glass feeders and has for the primary object, the provision of a device of this character which will permit an increased output or production to be easily accomplished, in that the device will feed mold charges more accurately and rapidly onto the press table now in use, so that two molds on the press table can be kept fed with mold charges, where heretofore only one mold has been employed, consequently doubling the number of pieces of glassware which may be finished.

Another object of this invention is the provision of means for continuously rotating the glass feed control element or tube of the feeder and also for reciprocating said glass feed control element or tube towards and from the outlet of the glass tank or reservoir.

A further object of this invention is the provision of means for creating in the tube suction or vacuum when said tube is moving away from the glass outlet to bring about charging of the tube with the liquid glass and to admit air pressure to the tube on the latter moving into a position in close proximity to the glass outlet for rapidly discharging the liquid glass contained in the tube and into a position for cutting by a mechanism associated with the glass outlet.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a glass feeder constructed in accordance with my invention.

Figure 2 is a vertical sectional view illustrating the device.

Figure 3 is a detail sectional view taken on line 3—3 of Figure 2.

Figure 4 is a plan view partly in section showing shears for cutting the glass in desired lengths as discharged and the operating means therefor.

Figure 5 is a fragmentary plan view partly in section showing one of the valve operating rods and its actuating cam.

Referring in detail to the drawings, the numeral 6 indicates a conventional type of glass tank in which glass is heated into a liquid form, the liquid glass being indicated by the character 7. The bottom wall of the tank 6 is provided with an outlet 8 and the top wall of the tank directly above said outlet 8 is provided with an opening 9 through which reciprocates a shaft 10 mounted for rotation in a journal 11 carried by a horizontally arranged supporting member 12. The lower end of the shaft 10 may be in the form of a conventional type of chuck or as shown in the drawings may be a clamp arrangement 13 for connecting the lower end of said shaft 10 into a glass feed control element or tube 14, the latter being of substantially bottle-shape, the neck portion being engaged by the clamp 13 with the lower end of the shaft extending therein. The lower end of the tube is fully open and during all positions of the tube the lower end of the latter remains submerged in the liquid glass 7.

A horizontally arranged platform 15 is carried by the tank 6 and rotatably supports a vertically arranged shaft 16 including upper and lower sections 17 and 18 having telescopic fit with each other. The sections 17 and 18 are splined together so that the section 17 may move vertically with respect to the section 18. The section 18 is journaled on the platform and held against endwise movement. The section 17 has formed thereon a cam 19 of the spiral type which engages with a roller 20 journaled on a block 21. The block 21 is mounted for vertical movement in spaced guides 22 carried by the platform 15 and has a feed stem 23 threaded thereto. The feed stem forms a part of a manually rotatable shaft 24, the latter being journaled on the platform, as indicated at 25, and also including a crank handle 26 to aid the operator in rotating the shaft 24 in opposite directions for the purpose of raising and lowering the block 21 and thereby varying the distance in which the cam 19 operating against the roller 20 may raise and lower the shaft section 17.

Arranged below the platform 15 is a bracket 27 and rotatably supports a power shaft 28. Power may be connected to said shaft 28 in any well known manner and the bracket 27 as shown in the drawings forms an integral part of the platform, underlies the same and is also secured onto the tank 6. Gearings 29 connect the power shaft 28 to the shaft 16. The section 17 of the shaft 16 is connected to the shaft 10 through the use of an endless sprocket chain 30 and sprocket gear 31. Thus it will be seen that the power shaft 28 drives the tube 14 through the gearings 29, shaft 16, sprocket chain 30, sprocket gear 31 and the shaft 10.

The supporting member 12 is equipped with a journal 32 similar in construction to the journal 11 and rotatably supports the section 17 of the shaft 16 on the member 12. These journals 11 and 32 are of such construction that the shaft 10 and the section 17 of the shaft 16 will be held against endwise movement with respect to the supporting member 12.

The supporting member 12 is designed to move upwardly and downwardly for the purpose of reciprocating the tube 14 towards and from the outlet 8. One end of the supporting member 12 is bent angularly to provide a vertically arranged piston stem 34 connected to a piston 35 reciprocally mounted in a cylinder 36 mounted on the platform. The upper end of the cylinder is fully open while the lower end of said cylinder is closed by the platform. Carried by the platform are valves 38 and 39 having communication with the lower portion of the cylinder. The valve 38 is connected to an air pressure supply pipe 40 while the valve 39 is open to the atmosphere. The control arms of the valves 38 and 39 are indicated at 41 and have pivotally connected thereto operating rods 42 slidably mounted on the bracket 27 and equipped with cam engaging ends 43. The cam engaging end 43 of the rod 42 connected to the valve 38 rides a cam 44 secured on the shaft 16 while the cam engaging end 43 of the rod of the valve 39 rides on a cam 45 secured on the shaft 16. The cams 44 and 45 have high faces and low faces and the cam engaging ends of the rods are urged to ride their respective cams by springs 46 of the coiled type surrounding said rods and bearing against the bracket 27 and the cam engaging ends of the rods.

The supporting member 12 and the piston stem portion 34 thereof has a passage 47 and the piston 35 has a passage 48 extending therethrough to connect the passage 47 with the lower portion of the cylinder 36. The journals 11 and 32 are provided with bypass passages 49 so that the passage 47 will not be interrupted by the journals and the bypass passage of the journal 11 connects the passage 47 with a passage 50 formed in the shaft 10 which opens outwardly through the lower end of said shaft to place the interior of the tube 14 in communication with the passage 47 and also the lower portion of the cylinder.

Shears 51 are located just below the outlet 8 for severing the glass secured from the tank a desired length and consists of pivotally mounted arm 52, the pivot being indicated by the character 53 and carried by the bottom wall of the tank. Opposed cutting blades 54 are formed on the arms 52 and have arcuate cutting edges 55 adapted to coact in severing the glass. The bracket 27 slidably supports an operating rod 56 for the shears and to which is secured a cross arm 57. Links 58 are pivotally connected to the ends of the cross arm 57 and to the shear arms 52 adjacent the pivot 53. The operating rod 56 has journaled thereon a roller 59 which rides the cam 60 secured on the shaft 16. A coil spring 61 acts on the cross arm 57 to maintain the roller 59 in riding engagement with the cam 60. The coil spring 61 is arranged between the cross arm 57 and a lug 62 mounted on the bottom of the tank 6. The cam 60 has high and low faces as clearly shown in Figure 4 to bring about pivotal movement of the shear arms and thereby cause the blades to move into and out of cutting position with respect to each other.

In operation, it is to be understood that the tube 14 is continuously rotated with its lower end submerged in the liquid glass 7 and that the cam 19 coacting with the roller 20 brings about reciprocation of the tube 14 towards and from the outlet 8 of the tank 6. Owing to the density of the liquid glass its natural flow out of the outlet 8 is extremely slow, therefore, the tube 14 is employed to bring about rapid and intermittent discharge of the liquid glass in determined amounts outwardly of the outlet and the shears are timed to operate by the construction of the cam 60 to sever the discharged glass in determined lengths. These lengths of glass are carried in any suitable way onto a press table (not shown) having molds. The lengths of glass are charges for the molds.

During the upward movement of the tube 14 by the cam 19 the piston 35 also moves upwardly in the cylinder 36. At this time the valves 38 and 39 are closed. The piston moving upwardly in the cylinder 36 creates a suction in the lower portion of the cylinder and due to the fact that the lower portion of the cylinder is in direct communication with the tube 14 this suction creates a vacuum in the tube 14 so that on the tube 14 moving upwardly a charge of glass is drawn into the tube. As the cam 19 lowers the piston 35 and the tube 14 the valve 39 is opened by the cam 45 connecting the lower end of the cylinder to the atmosphere so that atmospheric pressure may then enter the tube on its downward movement. As the piston 35 nears its lowermost position in the cylinder 36 and the tube 14 reaches a position in close proximity to the outlet 8 the valve 39 closes and the valve 38 opens, admitting a charge of compressed air into the cylinder which passes into the tube driving therefrom a liquid glass and through the outlet 8. As the charge of liquid glass in the tube is discharged therefrom and through the outlet 8 the shears are operated by their respective cams to sever the glass into the desired length for charging a mold.

It is believed that the foregoing description, when taken in connection with the drawings will fully set forth the construction and advantages of the present invention to those skilled in the art to which such a device relates, so that further detailed description will not be required.

Having thus described the invention, what I claim is:

1. A liquid glass feeder including a tank containing liquefied glass and having an outlet and a platform, a control tube reciprocal relative to the outlet within the liquefied glass, a supporting member arranged above the tank and having a passage, a shaft journaled on said supporting member and held against endwise movement and having a passage in communication with the first-named passage, means for connecting said shaft to the tube to place the passage thereof in communication with the tube, a second shaft journaled on the platform and including telescopic sections splined together and one of said sections journaled on the supporting member and held against endwise movement, a drive means between said shafts, means for connecting the second shaft to a power means, means for bringing about reciprocation of the sections of the second shaft journaled on said member and thereby reciprocate the tube relative to the outlet, and a combined suction and air pressure means connected with the passage of the supporting member for developing a partial vacuum in the tube as the latter moves away from the outlet to draw a charge of liquefied glass in the tube and to admit air pressure to the tube on the latter nearing the outlet to drive the charge of glass in the tube through the outlet.

2. A liquid glass feeder including a tank containing liquefied glass and having an outlet and a platform, a control tube reciprocal relative to the outlet within the liquefied glass, a supporting member arranged above the tank and having a passage, a shaft journaled on said supporting member and held against endwise movement and having a passage in communication with the first-named passage, means for connecting said shaft to the tube to place the passage thereof in communication with the tube, a second shaft journaled on the platform and including telescopic sections splined together and one of said sections journaled on the supporting member and held against endwise movement, a drive means between said shafts, means for connecting the second shaft to a power means, a cam secured on the section of the second shaft connected with the supporting member, means on the platform engageable with said shaft to bring about reciprocation of the tube during the rotation of the second named shaft, and a combined suction and air pressure means connected to the passage of the supporting member for developing a partial vacuum in the tube as the latter moves away from the outlet to draw a charge of liquefied glass in the tube and to admit air pressure to the tube on the latter nearing the outlet to drive the charge of glass in the tube through the outlet.

3. A liquid glass feeder including a tank containing liquefied glass and having an outlet and a platform, a control tube reciprocal relative to the outlet within the liquefied glass, a supporting member arranged above the tank and having a passage, a shaft journaled on said supporting member and held against endwise movement and having a passage in communication with the first-named passage, means for connecting said shaft into the tube to place the passage thereof in communication with the tube, a second shaft journaled on the platform and including telescopic sections splined together and one of said sections journaled on the supporting member and held against endwise movement, a drive means between said shafts, means for connecting the second shaft to a power means, a cam secured on the section of the second shaft connected with the supporting member, means engageable with said cam and adjustably mounted on the platform to bring about reciprocation of the tube during the rotation of the second shaft, a cylinder mounted on the platform, a piston connected to the supporting member and reciprocally mounted in the cylinder and having a passage in communication with the passage of the supporting member placing the latter-named passage in communication with the cylinder, a valve connected to the cylinder for opening the latter to the atmosphere, a valve connecting said cylinder to an air pressure supply means, cam mechanisms secured on the second shaft and operatively connected with said valves for the opening and closing of said valves in accordance with the position of the tube with respect to the outlet.

4. A liquid glass feeder including a tank containing liquefied glass and having an outlet and a platform, a control tube reciprocal relative to the outlet within the liquefied glass, a supporting member arranged above the tank and having a passage, a shaft journaled on said supporting member and held against endwise movement and having a passage in communication with the first-named passage, means for connecting said shaft into the tube to place the passage thereof in communication with the tube, a second shaft journaled on the platform and including telescopic sections splined together and one of said sections journaled on the supporting member and held against endwise movement, a drive means between said shafts, means for connecting the second shaft to a power means, a cam secured on the section of the second shaft connected with the supporting member, means engageable with said cam and adjustably mounted on the platform to bring about reciprocation of the tube during the rotation of the second shaft, a cylinder mounted on the platform, a piston connected to the supporting member and reciprocally mounted in the cylinder and having a passage in communication with the passage of the supporting member placing the latter-named passage in communication with the cylinder, a valve connected to the cylinder for opening the latter to the atmosphere, a valve connecting said cylinder to an air pressure supply means, cam mechanisms secured on the second shaft and operatively connected with said valves for the opening and closing of said valves in accordance with the position of the tube with respect to the outlet, shears pivotally mounted on the tank for cutting the glass discharged through said outlet in desired lengths, an operating means slidable on the tank and pivoted to the shears, a cam driven by the second shaft for effecting operation of said operating means.

EDGAR JACOB RUSH.